United States Patent
Wang et al.

(10) Patent No.: US 12,511,863 B2
(45) Date of Patent: Dec. 30, 2025

(54) METHOD FOR DETERMINING FLOOR PLANE AND HOST

(71) Applicant: HTC Corporation, Taoyuan (TW)

(72) Inventors: Yun-Ting Wang, Taoyuan (TW); Nien Hsin Chou, Taoyuan (TW)

(73) Assignee: HTC Corporation, Taoyuan (TW)

(*) Notice: Subject to any disclaimer, the term of this patent is extended or adjusted under 35 U.S.C. 154(b) by 338 days.

(21) Appl. No.: 18/301,263

(22) Filed: Apr. 17, 2023

(65) Prior Publication Data
US 2023/0394782 A1    Dec. 7, 2023

Related U.S. Application Data

(60) Provisional application No. 63/349,589, filed on Jun. 7, 2022.

(51) Int. Cl.
*G06K 9/00* (2022.01)
*G06V 10/42* (2022.01)
*G01C 15/00* (2006.01)

(52) U.S. Cl.
CPC ........... *G06V 10/42* (2022.01); *G01C 15/002* (2013.01)

(58) Field of Classification Search
CPC ......... G06V 10/42; G06V 10/25; G06V 10/44
See application file for complete search history.

(56) References Cited

U.S. PATENT DOCUMENTS 7,653,216 B2 * 1/2010 Kanade .................. G06T 7/593
                                                           382/153
9,996,974 B2 * 6/2018 Reisner-Kollmann .......
                                                         G06T 19/006
2010/0321490 A1 * 12/2010 Chen .......................... G06T 7/62
                                                           348/118
2014/0118397 A1 * 5/2014 Lee ........................... G06T 7/521
                                                           345/633
2014/0350839 A1 * 11/2014 Pack .................... G05D 1/0231
                                                           901/1
2017/0270372 A1 * 9/2017 Stein ...................... G06V 20/56
(Continued)

FOREIGN PATENT DOCUMENTS

CN          105765631         7/2016
CN          110310175        12/2020
(Continued)

OTHER PUBLICATIONS

Map Management for Efficient Simultaneous Localization and Mapping (SLAM), Gamini Dissanayake et al., 2002, pp. 267-286 (Year: 2002).*
(Continued)

*Primary Examiner* — Jayesh A Patel
(74) *Attorney, Agent, or Firm* — JCIPRNET

(57) ABSTRACT

The embodiments of the disclosure provide a method for determining a floor plane and a host. The method includes: determining a first plane as a reference floor plane based on motion data; in response to determining that the host has moved for a predetermined distance after determining the first plane as the reference floor plane, determining a plurality of first feature points on the reference floor plane; determining a second plane based on the first feature points on the reference floor plane; and in response to determining that the second plane meets a predetermined condition, determining the second plane as the reference floor plane.

20 Claims, 4 Drawing Sheets

(56) References Cited

U.S. PATENT DOCUMENTS

| | | | | |
|---|---|---|---|---|
| 2018/0075593 A1* | 3/2018 | Wang | .................. | G06V 40/103 |
| 2018/0365502 A1* | 12/2018 | Stein | .......................... | G06T 7/74 |
| 2019/0197709 A1 | 6/2019 | Windmark et al. | | |
| 2022/0067973 A1* | 3/2022 | Lee | ........................... | G06T 7/80 |
| 2022/0237866 A1* | 7/2022 | Stein | ....................... | G06T 17/00 |

FOREIGN PATENT DOCUMENTS

| | | | | |
|---|---|---|---|---|
| CN | 113228117 | | 8/2021 | |
| EP | 2798611 | | 7/2018 | |
| EP | 3508935 | | 7/2019 | |
| JP | WO2005088244 A1 * | | 1/2008 | .............. G06T 7/73 |
| JP | 2009276073 | | 11/2009 | |
| TW | 202119359 | | 5/2021 | |
| WO | WO-2007017693 A1 * | | 2/2007 | ............. G06T 7/246 |
| WO | WO-2020021596 A1 * | | 1/2020 | ............. G01C 21/28 |

OTHER PUBLICATIONS

On-Road Vehicle Detection: A Review, Zehang Sun et al., IEEE, 2006, pp. 694-711 (Year: 2006).*
3D Vehicle Sensor based on Monocular Vision, Daniel Ponsa et al., IEEE, 2005, pp. 1096-1101 (Year: 2005).*
"Office Action of Taiwan Counterpart Application", issued on Apr. 16, 2024, p. 1-p. 5.
"Office Action of China Counterpart Application", issued on Jul. 18, 2025, p. 1-p. 7.

\* cited by examiner

METHOD FOR DETERMINING FLOOR PLANE AND HOST

CROSS-REFERENCE TO RELATED APPLICATION

This application claims the priority benefit of U.S. provisional application Ser. No. 63/349,589, filed on Jun. 7, 2022. The entirety of the above-mentioned patent application is hereby incorporated by reference herein and made a part of this specification.

BACKGROUND

1. Field of the Invention

The present disclosure generally relates to a tracking mechanism, in particular, to a method for determining a floor plane and a host.

2. Description of Related Art

See FIG. 1A and FIG. 1B, wherein FIG. 1A shows a schematic diagram of a skew coordinate system, and FIG. 1B shows a schematic diagram of a skew floor plane.

Conventionally, when a tracking system (which uses tracking mechanisms such as inside-out tracking) is used to track poses of devices (e.g., a head-mounted display (HMD)), the tracking system needs to firstly determine a coordinate system 10 and accordingly determine the poses of the tracked devices, wherein the y-z plane can be understood as the floor plane corresponding to the coordinate system 10.

However, as time goes by, the tracked device (e.g., the HMD) may move around, and the considered coordinate (e.g., the coordinate system 10') may deviate from the correct coordinate system (e.g., the coordinate system 10) due to, for example, accumulated tracking errors.

In FIG. 1A, the x-axis of the coordinate system 10' may deviate from the x-axis of the coordinate system 10 by a skew angle (referred to as φ), which causes the floor plane (e.g., the y-z plane) corresponding to the coordinate system 10' to deviate from the floor plane corresponding to the coordinate system 10 by the skew angle as well.

In this case, the tracked height of the HMD may be different from the height perceived by the user of the HMD. Since the visual content (e.g., a virtual reality (VR) visual content) provided by the HMD is rendered based on the tracked pose of the HMD, the user may feel weird when viewing the visual content.

SUMMARY OF THE INVENTION

Accordingly, the disclosure is directed to a method for determining a floor plane and a host, which may be used to solve the above technical problems.

The embodiments of the disclosure provide a method for determining a floor plane, adapted to a host, including: determining a first plane as a reference floor plane based on motion data; in response to determining that the host has moved for a predetermined distance after determining the first plane as the reference floor plane, determining a plurality of first feature points on the reference floor plane; determining a second plane based on the first feature points on the reference floor plane; and in response to determining that the second plane meets a predetermined condition, determining the second plane as the reference floor plane.

The embodiments of the disclosure provide a host including a storage circuit and a processor. The storage circuit stores a program code. The processor is coupled to the non-transitory storage circuit, accessing the program code to perform: determining a first plane as a reference floor plane based on motion data; in response to determining that the host has moved for a predetermined distance after determining the first plane as the reference floor plane, determining a plurality of first feature points on the reference floor plane; determining a second plane based on the first feature points on the reference floor plane; and in response to determining that the second plane meets a predetermined condition, determining the second plane as the reference floor plane.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the disclosure.

DESCRIPTION OF THE EMBODIMENTS

Figure 1A:
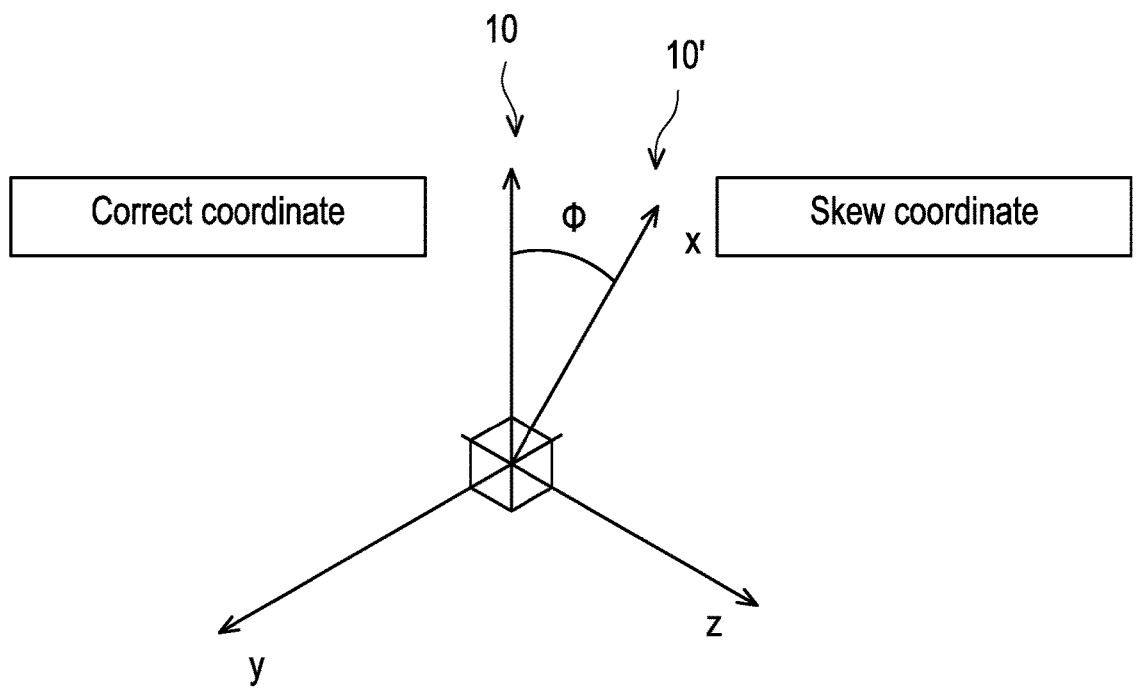
FIG. 1A shows a schematic diagram of a skew coordinate system.
Figure 1B:
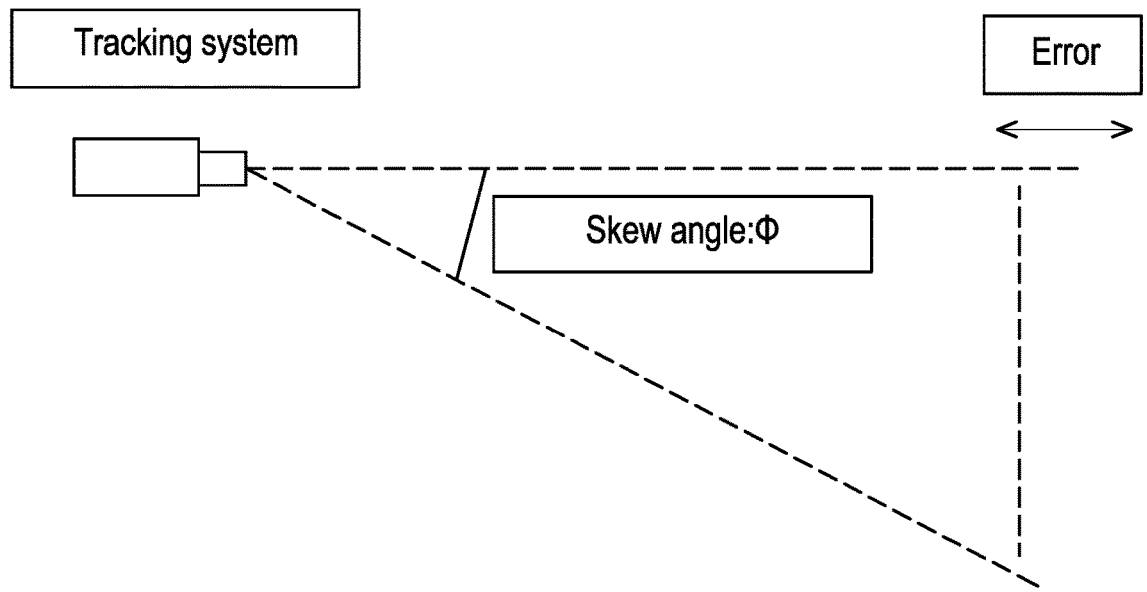
FIG. 1B shows a schematic diagram of a skew floor plane.

Reference will now be made in detail to the present preferred embodiments of the invention, examples of which are illustrated in the accompanying drawings. Wherever possible, the same reference numbers are used in the drawings and the description to refer to the same or like parts.

Figure 2:
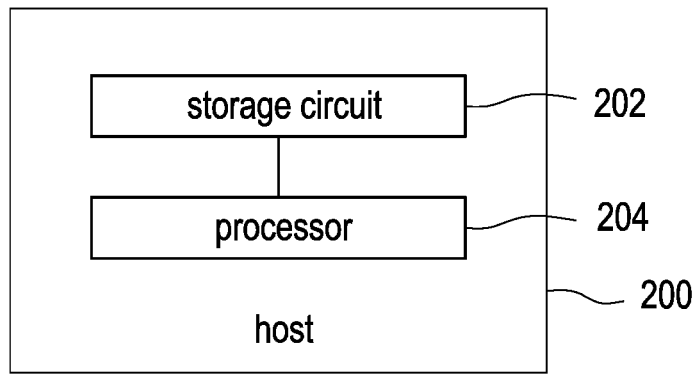
FIG. 2 shows a schematic diagram of a host according to an embodiment of the disclosure.

See FIG. 2, which shows a schematic diagram of a host according to an embodiment of the disclosure. In FIG. 2, the host 200 can be any device capable of tracking the pose thereof via performing inside-out tracking mechanisms (e.g., Simultaneous Localization and Mapping (SLAM)), but the disclosure is not limited thereto. In one embodiment, the host 200 can be the HMD that provides AR/VR services/contents.

In some embodiments, the HMD can include a (front) camera having a field of view (FOV), and the HMD can perform tracking functions based on the images captured by the camera, but the disclosure is not limited thereto. In the disclosure, details of the inside-out tracking mechanism can be referred to the related prior arts, and the details thereof would not be further described.

In FIG. 2, the host 200 includes a storage circuit 202 and a processor 204. The storage circuit 202 is one or a combination of a stationary or mobile random access memory (RAM), read-only memory (ROM), flash memory, hard disk, or any other similar device, and which records a plurality of modules that can be executed by the processor 204.

The processor 204 may be coupled with the storage circuit 202, and the processor 204 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In the embodiments of the disclosure, the processor 204 may access the modules stored in the storage circuit 202 to implement the method for determining a floor plane provided in the disclosure, which would be further discussed in the following.

Figure 3:
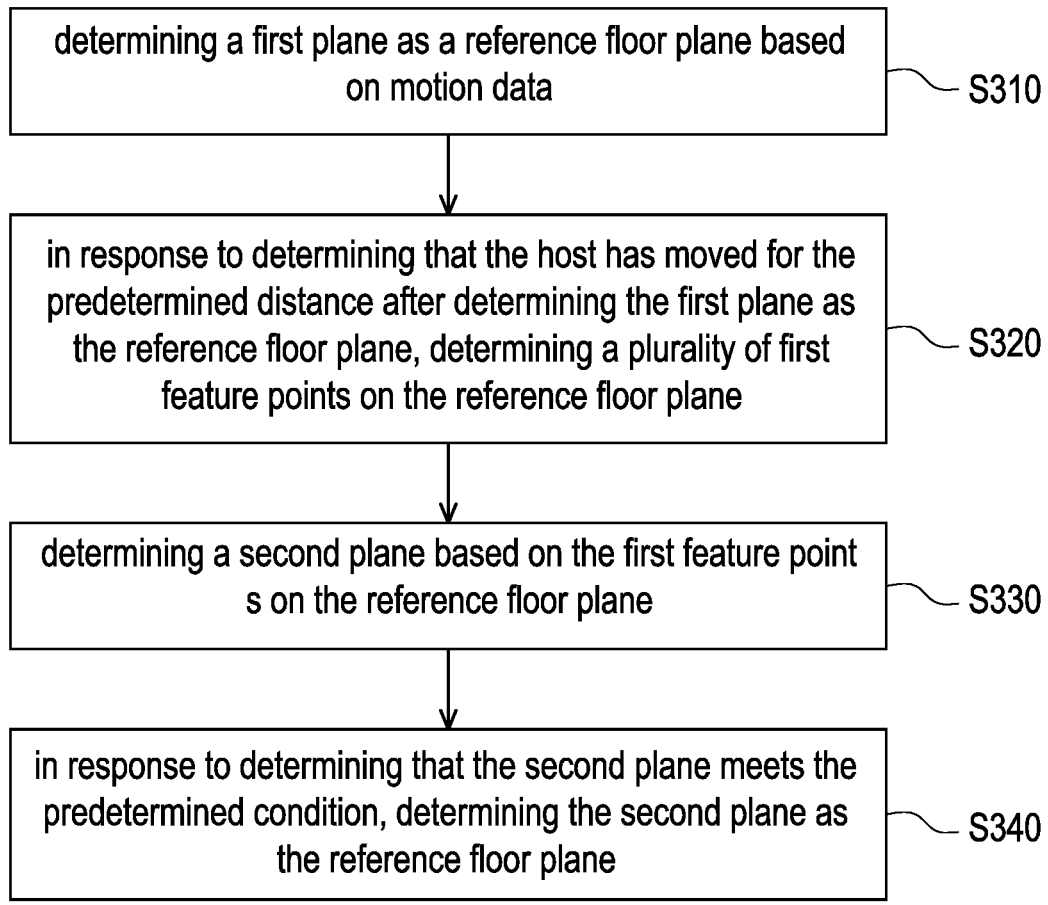
FIG. 3 shows a flow chart of the method for determining a floor plane according to an embodiment of the disclosure.

See FIG. 3, which shows a flow chart of the method for determining a floor plane according to an embodiment of the disclosure. The method of this embodiment may be executed by the host 200 in FIG. 2, and the details of each step in FIG. 3 will be described below with the components shown in FIG. 2.

Firstly, in step S310, the processor 204 determines a first plane as a reference floor plane based on motion data.

In one embodiment, the host 200 may include a motion detection circuit (e.g., an inertial measurement unit (IMU)) for collecting the motion data, and the collected motion data may be 6 degree-of-freedom (DOF) data, but the disclosure is not limited thereto.

In the embodiment, how the processor 204 determines a floor plane based on the motion data (e.g., IMU data) can be referred to the related prior arts, which would not be further discussed herein.

In the embodiments of the disclosure, the processor 204 can establish a coordinate system based on the motion data and accordingly determine a floor plane as the first plane (e.g., the reference floor plane), but the disclosure is not limited thereto.

In the embodiments of the disclosure, the processor 204 may determine a pose of the host 200 based on the reference floor plane, and the details thereof can also be referred to the related prior arts, which would not be further discussed herein. That is, the processor 204 may determine the pose of the host 200 based on the first plane.

In one embodiment, the processor 204 may determine whether the host 200 has moved for a predetermined distance (e.g., 1 meter or any other distance preferred by the designer) after determining the first plane as the reference floor plane.

In one embodiment, if the processor 204 determines that the host 200 has not moved for the predetermined distance after determining the first plane as the reference floor plane, the processor 204 may maintain the first plane as the reference floor plane. That is, the processor 204 may still determine the pose of the host 200 based on the first plane in the case where the host 200 has not moved for the predetermined distance after determining the first plane as the reference floor plane.

In another embodiment, if the processor 204 determines that the host 200 has moved for the predetermined distance after determining the first plane as the reference floor plane, the processor 204 may perform step S320.

In step S320, in response to determining that the host has moved for the predetermined distance after determining the first plane as the reference floor plane, the processor 204 determines a plurality of first feature points on the reference floor plane.

Figure 4:
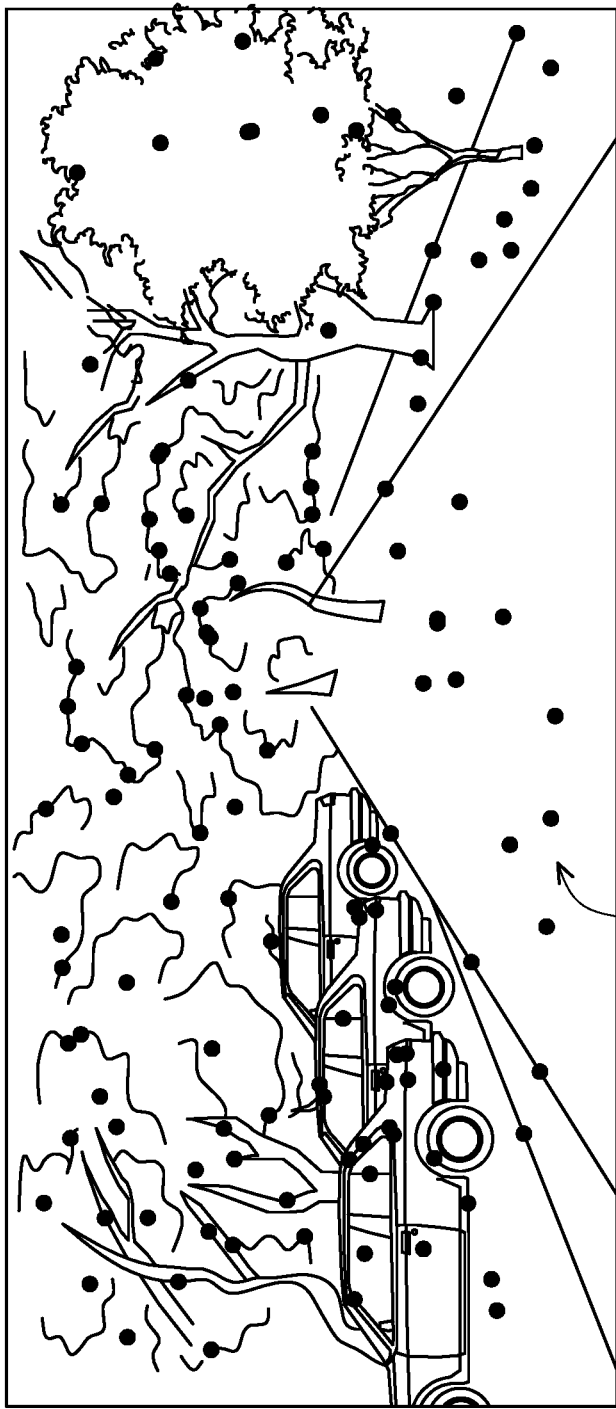
FIG. 4 shows a schematic diagram of determining feature points on the reference floor plane according to an embodiment of the disclosure.

See FIG. 4, which shows a schematic diagram of determining feature points on the reference floor plane according to an embodiment of the disclosure. In FIG. 4, the processor 204 may obtain an image 400 corresponding to a front view of the host 200 via, for example, using the front camera of the host 200. Next, the processor 204 may identify an image region 410 corresponding to the reference floor plane and determine a plurality of feature points within the image region 410 as the plurality of first feature points on the reference floor plane.

From another perspective, the processor 204 may determine the feature points (which is exemplarily shown a dots in FIG. 4) in the image 400 based on, for example, SLAM, and the processor 204 may determine the image region 410 corresponding to the reference floor plane. In FIG. 4, the image regions corresponding to non-floor objects (e.g., cars, trees, houses, etc.) would not be regarded as the image region 410. Next, the processor 204 determines the feature points within the image region 410 as the plurality of first feature points.

In step S330, the processor 204 determines a second plane based on the first feature points on the reference floor plane.

In one embodiment, the processor 204 may determine whether a number of the first feature points is higher than a predetermined threshold (e.g., 3 or more). If yes, the processor 204 performs step S330; if not, the processor 204 may not perform step S330 until the number of the first feature points is higher than the predetermined threshold, but the disclosure is not limited thereto.

In one embodiment, in the procedure of determining the second plane based on the first feature points on the reference floor plane, the processor 204 may determine at least one candidate plane, wherein the at least one candidate plane comprises a first candidate plane. In one embodiment, the processor 204 may determine the at least one candidate plane in the coordinate system used for tracking the pose of the host 200, but the disclosure is not limited thereto.

Next, the processor 204 may determine an error characteristic corresponding to each candidate plane. For example, the error characteristic corresponding to the first candidate plane may include an average distance between each first feature point and the first candidate plane, but the disclosure is not limited thereto.

In one embodiment, in response to determining that the error characteristic corresponding to the first candidate plane is minimum among the at least one candidate plane, the processor 204 may determine the first candidate plane as the second plane.

That is, the processor 204 may determine the candidate plane having a minimum average distance to each first feature point as the second plane, but the disclosure is not limited thereto.

After determining the second plane, the processor 204 may determine whether the second plane meets a predetermined condition. For example, the processor 204 may determine whether the average distance corresponding to the second plane is within a predetermined range. If yes, the processor 204 may determine that the second plane meets the predetermined condition; if not, the processor 204 may determine that the second plane does not meet the predetermined condition, but the disclosure is not limited thereto.

In step S340, in response to determining that the second plane meets the predetermined condition, the processor 204 determine the second plane as the reference floor plane. That is, the processor 204 may regard the second plane as the new reference floor plane and accordingly track the pose of the host 200, but the disclosure is not limited thereto.

In one embodiment, after step S340, the processor 204 may further determine whether the host 200 has moved for the predetermined distance after determining the second plane as the reference floor plane. If not, the processor 204 may maintain the second plane as the reference floor plane;

if yes, the processor 204 may determine a plurality of second feature points on the reference floor plane (i.e., the second plane).

In the embodiment, how the processor 204 determines the second feature points on the reference floor plane can be referred to the descriptions of FIG. 4, which would not be repeated herein.

Next, the processor 204 can determine a third plane based on the second feature points on the reference floor plane, and the details thereof can be referred to the descriptions of how the processor 204 determine the second plane based on the first feature points, which would not be repeated herein.

After determining the third plane, the processor 204 can determine whether the third plane meets the predetermined condition. For example, the processor 204 may determine whether the average distance between the third plane and each second feature point is within the predetermined range. If yes, the processor 204 may determine that the third plane meets the predetermined condition; if not, the processor 204 may determine that the third plane does not meet the predetermined condition, but the disclosure is not limited thereto.

In one embodiment, in response to determining that the third plane meets the predetermined condition, the processor 204 can determine the third plane as the reference floor plane.

From another perspective, the processor 204 can be regarded as monitoring whether the host 200 has moved for the predetermined distance after determining a plane as the reference floor plane. If yes, the processor 204 finds feature points on the reference floor plane and determine a new plane accordingly. Next, if the new plane meets the predetermined condition, the processor 204 can determine the new plane as the reference floor plane and accordingly track the pose of the host 200, and the processor 204 can start monitoring whether the host 200 has moved for the predetermined distance again.

Accordingly, the reference floor plane used to track the pose of the host 200 can be updated as the host 200 moves around, such that the tracking accuracy would not be decreased as the host 200 move farther.

Figure 5:
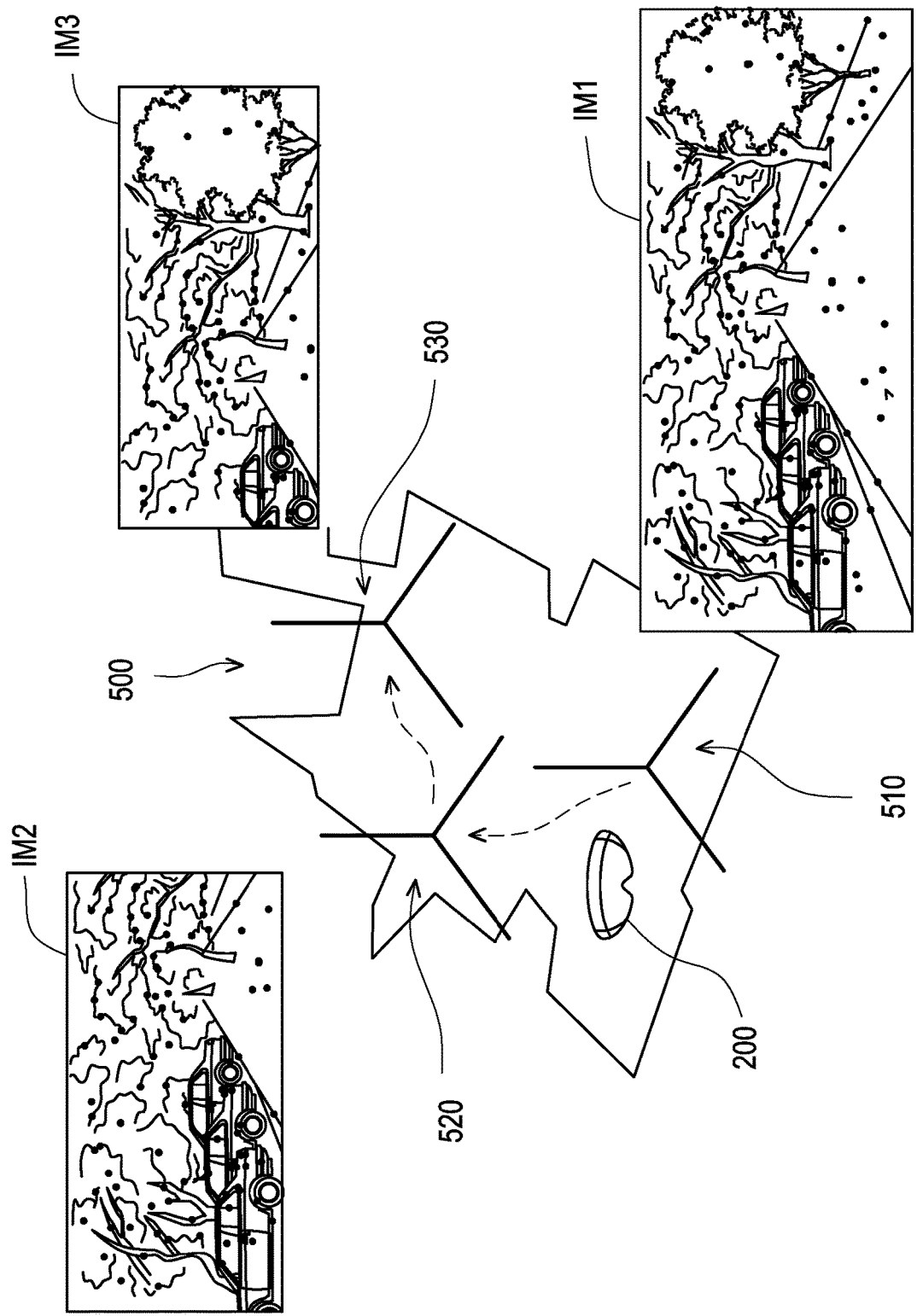
FIG. 5 shows an application scenario according to an embodiment of the disclosure.

See FIG. 5, which shows an application scenario according to an embodiment of the disclosure. In FIG. 5, it is assumed that the host 200 (e.g., the HMD) moves around in the field 500.

Firstly, the host 200 can sequentially perform: (1) determining a reference floor plane (which can be also regarded as determining a coordinate system 510 since the reference floor corresponds to the y-z plane of the coordinate system 510) based on the feature points corresponding to the floor plane within the captured image IM1; (2) after the host 200 moves for the predetermined distance, determining another reference floor plane (which can be also regarded as determining a coordinate system 520 since the another reference floor corresponds to the y-z plane of the coordinate system 520) based on the feature points corresponding to the floor plane within the captured image IM2; (3) after the host 200 moves for the predetermined distance, determining yet another reference floor plane (which can be also regarded as determining a coordinate system 530 since the yet another reference floor corresponds to the y-z plane of the coordinate system 530) based on the feature points corresponding to the floor plane within the captured image IM3.

To sum up, the embodiments of the disclosure provide a solution that adaptively update the considered reference floor plane based on the feature points corresponding to the floor plane. Accordingly, the tracking accuracy of the pose of the host can be improved due to the more accurate reference floor plane (and/or the coordinate system). From another perspective, the tracking error would not be accumulated along with the increasing moving distance of the host, and hence the problem of the skew floor plane can be avoided. In this case, the tracked height of the host may be more consistent with the height perceived by the user of the host, such that the user would not feel weird when viewing the visual content provided by the host.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. A method for determining a floor plane to correct for accumulated tracking errors of a tracking system of a host, comprising:
   determining a first plane as a reference floor plane based on motion data;
   in response to determining that the host has moved for a predetermined distance after determining the first plane as the reference floor plane, determining a plurality of first feature points on the reference floor plane;
   determining a second plane based on the first feature points on the reference floor plane; and
   in response to determining that the second plane meets a predetermined condition, determining the second plane as an updated reference floor plane to replace the first plane, thereby correcting for the accumulated tracking errors.

2. The method according to claim 1, wherein the motion data is collecting by a motion detection circuit on the host.

3. The method according to claim 1, wherein the step of determining the second plane based on the first feature points on the reference floor plane comprises:
   determining at least one candidate plane, wherein the at least one candidate plane comprises a first candidate plane;
   determining an error characteristic corresponding to each candidate plane;
   in response to determining that the error characteristic corresponding to the first candidate plane is minimum among the at least one candidate plane, determining the first candidate plane as the second plane.

4. The method according to claim 3, wherein the error characteristic corresponding to the first candidate plane comprises an average distance between each first feature point and the first candidate plane.

5. The method according to claim 1, further comprising:
   determining an average distance between each first feature point and the second plane;
   in response to determining that the average distance corresponding to the second plane is within a predetermined range, determining that the second plane meets the predetermined condition;
   in response to determining that the average distance corresponding to the second plane is not within the predetermined range, determining that the second plane does not meet the predetermined condition.

6. The method according to claim 1, wherein before the step of determining the second plane based on the first feature points on the reference floor plane, the method further comprises:

in response to determining that a number of the first feature points is higher than a predetermined threshold, determining the second plane based on the first feature points on the reference floor plane.

7. The method according to claim 1, wherein after the step of determining the second plane as the updated reference floor plane, the method further comprises:
in response to determining that the host has moved for the predetermined distance after determining the second plane as the updated reference floor plane, determining a plurality of second feature points on the updated reference floor plane;
determining a third plane based on the second feature points on the updated reference floor plane; and
in response to determining that the third plane meets the predetermined condition, determining the third plane as the reference floor plane.

8. The method according to claim 1, wherein the step of determining the plurality of first feature points on the reference floor plane comprises:
obtaining an image corresponding to a front view of the host;
identifying an image region corresponding to the reference floor plane;
determining a plurality of feature points within the image region as the plurality of first feature points on the reference floor plane.

9. The method according to claim 1, further comprising:
determining a pose of the host based on the reference floor plane.

10. The method according to claim 1, further comprising:
in response to determining that the host has not moved for the predetermined distance after determining the first plane as the reference floor plane, maintaining the first plane as the reference floor plane.

11. A host, comprising:
a non-transitory storage circuit, storing a program code;
a processor, coupled to the non-transitory storage circuit, accessing the program code for determining a floor plane to correct for accumulated tracking errors of a tracking system of the host to perform:
determining a first plane as a reference floor plane based on motion data;
in response to determining that the host has moved for a predetermined distance after determining the first plane as the reference floor plane, determining a plurality of first feature points on the reference floor plane;
determining a second plane based on the first feature points on the reference floor plane; and
in response to determining that the second plane meets a predetermined condition, determining the second plane as an updated reference floor plane to replace the first plane, thereby correcting for the accumulated tracking errors.

12. The host according to claim 11, further comprising a motion detection circuit collecting the motion data.

13. The host according to claim 11, wherein the processor performs:
determining at least one candidate plane, wherein the at least one candidate plane comprises a first candidate plane;
determining an error characteristic corresponding to each candidate plane;
in response to determining that the error characteristic corresponding to the first candidate plane is minimum among the at least one candidate plane, determining the first candidate plane as the second plane.

14. The host according to claim 13, wherein the error characteristic corresponding to the first candidate plane comprises an average distance between each first feature point and the first candidate plane.

15. The host according to claim 11, wherein the processor further performs
determining an average distance between each first feature point and the second plane;
in response to determining that the average distance corresponding to the second plane is within a predetermined range, determining that the second plane meets the predetermined condition;
in response to determining that the average distance corresponding to the second plane is not within the predetermined range, determining that the second plane does not meet the predetermined condition.

16. The host according to claim 11, wherein before determining the second plane based on the first feature points on the reference floor plane, the processor further performs
in response to determining that a number of the first feature points is higher than a predetermined threshold, determining the second plane based on the first feature points on the reference floor plane.

17. The host according to claim 11, wherein after determining the second plane as the updated reference floor plane, the processor further performs:
in response to determining that the host has moved for the predetermined distance after determining the second plane as the updated reference floor plane, determining a plurality of second feature points on the updated reference floor plane;
determining a third plane based on the second feature points on the updated reference floor plane; and
in response to determining that the third plane meets the predetermined condition, determining the third plane as the reference floor plane.

18. The host according to claim 11, wherein the processor performs:
obtaining an image corresponding to a front view of the host;
identifying an image region corresponding to the reference floor plane;
determining a plurality of feature points within the image region as the plurality of first feature points on the reference floor plane.

19. The host according to claim 11, wherein the processor further performs:
determining a pose of the host based on the reference floor plane.

20. The host according to claim 11, wherein the processor further performs:
in response to determining that the host has not moved for the predetermined distance after determining the first plane as the reference floor plane, maintaining the first plane as the reference floor plane.

* * * * *